Figure 1:
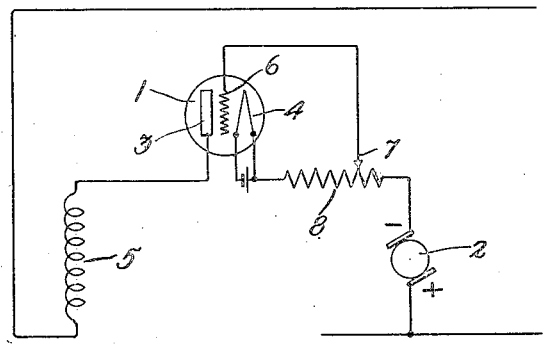

June 19, 1923.

P. I. WOLD

THERMIONIC REGULATOR

Filed July 29, 1918

Inventor:
Peter Irving Wold.
by J.E.Roberts Att'y.

Patented June 19, 1923.

1,459,428

UNITED STATES PATENT OFFICE.

PETER IRVING WOLD, OF EAST ORANGE, NEW JERSEY, ASSIGNOR TO WESTERN ELECTRIC COMPANY, INCORPORATED, OF NEW YORK, N. Y., A CORPORATION OF NEW YORK.

THERMIONIC REGULATOR.

Application filed July 29, 1918. Serial No. 247,276.

*To all whom it may concern:*

Be it known that I, PETER IRVING WOLD, a citizen of the United States, residing at East Orange, in the county of Essex and State of New Jersey, have invented certain new and useful Improvements in Thermionic Regulators, of which the following is a full, clear, concise, and exact description.

This invention relates to a novel type of regulator which is applicable in general for the regulation of electric currents and is particularly adapted to be employed for regulating the electrical output, such as the voltage or current of a generator, or for controlling the electrical energy applied to a motor in order that its speed may be regulated.

An object of this invention is to produce a regulator for electric generators which will maintain a constant voltage or a constant current output. Another object is to produce such a regulator as will be continuously acting and in which there will be no moving parts, such as are present in relays and the like. Still another object is to provide a regulator that is light in weight and which may be readily employed as a regulator for an electric machine without the necessity of altering the construction of the machine.

The regulator provided according to the present invention is of the thermionic type such as an audion comprising a vacuum tube containing electrodes. The manner in which such a vacuum tube is employed as a regulator is this: The vacuum tube comprises a cathode which serves as a source of electrons that travel to the anode or plate electrode. The amount of this electron stream or space current depends upon several factors, primarily upon (*a*) the voltage applied between these electrodes; (*b*) the temperature of the cathode, an increase in temperature producing a stronger space current; and (*c*) the potential of the grid electrode with respect to the filament, the more positive the potential of the grid within certain limits, the greater will be the space current.

An important feature of this invention is that such a vacuum tube as above described is an amplifier, that is, the application of a given voltage on the grid is more effective in controlling the impedance of the tube as measured between the cathode and anode electrodes than the application of the same voltage applied between the two last mentioned electrodes. On account of its amplifying properties a vacuum tube of the three-electrode type is therefore well adapted to regulate the current or voltage of a circuit with great sensitiveness.

If it is desired to regulate the output of the generator in accordance with this invention, the field winding thereof may be connected in circuit with the cathode and plate electrodes. The output of the generator depends of course upon the field current which, within limits, is controlled by the current flowing between the cathode and plate electrodes and which may be varied in intensity by varying the potential applied to the grid. The increase in the voltage or current of the generator serves to vary the potential of the grid, thereby modifying the space current so that the desired regulation is obtained.

More specifically, the vacuum tube is connected in circuit with the field winding of a series wound generator and the grid is responsive to the current generated in order to regulate for constant current.

Figure 2:
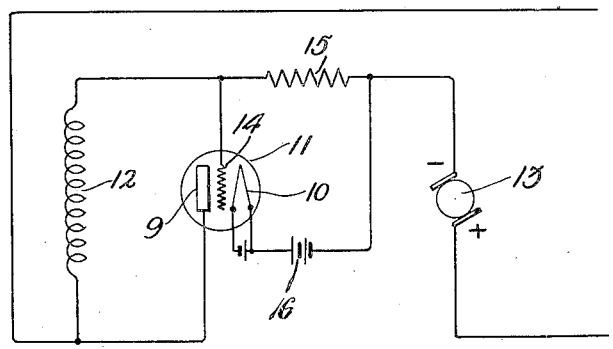

Referring to the drawings, Fig. 1 shows a thermionic regulator for keeping the current substantially constant for a series generator. Fig. 2 is a modification of Fig. 1, the vacuum tube being in shunt with the winding instead of in series therewith as in Fig. 1.

In Fig. 1 the amplifier 1 is shown connected to a series wound generator 2 in such a manner as to regulate for constant current output. The anode 3 and cathode 4 of the vacuum tube amplifier are in series with the field winding 5, while the grid 6 is connected by tap 7 to a resistance 8 that is included between the cathode 4 and the negative terminal of the generator. The grid is therefore negative with respect to the cathode by the I R drop in that part of resistance 8 included between the tap 7 and the cathode 4. If the current delivered by the generator 2 tends to increase, the grid 6 tends to become more negative with respect to cathode 4 than it was before, thereby increasing the impedance in the space between the electrodes 3 and 4 and consequently decreasing the current through the field winding 5 and reducing the voltage generated. Aside from the control which the variation in impedance of the vacuum tube 1 has on the field current, this variation would also, of course, tend to keep the current in the load circuit connected to the generator constant, since the electrodes 3 and 4 are connected in series with this circuit.

Fig. 2 differs from that of Fig. 1 in that the anode 9 and cathode 10 of the vacuum tube device 11 are connected in shunt to the field winding 12 of the series wound generator 13. The potential of the grid 14 is determined by the I R drop of the resistance 15 which is connected between the grid and the cathode and which is adapted to be traversed by the current flowing from the negative terminal of the machine through the field winding 12. If the current delivered by the generator tends to increase, the grid becomes more positive with respect to the cathode, thereby decreasing the impedance between the electrode 9 and 10 which serves to divert current from the field winding 12, thereby reducing the excitation of the voltage generated.

If desired, a battery, such as 16 of Fig. 2, may be inserted in the grid circuit of either modification shown for the purpose of determining the portion of the vacuum tube characteristic on which operation shall take place. Obviously, this battery will be poled to make the grid more positive or more negative as may be needed.

What is claimed is:

1. The combination of an electrical machine having a series winding, a vacuum tube device comprising an anode and cathode connected in circuit with said winding, said device also comprising a controlling electrode, and an impedance device connected between the negative terminal of said machine and said controlling electrode.

2. The combination of a generator having a series winding, a vacuum tube having an anode, a cathode and a grid, said anode and cathode being in circuit with said winding, an empedance between the negative terminal of said generator and said winding, said grid being connected to that terminal of said impedance which is electrically remote from the negative terminal of said generator, said cathode being connected to the opposite terminal of said impedance.

In witness whereof, I hereunto subscribe my name this 27th day of July, A. D. 1918.

PETER IRVING WOLD.